Patented Nov. 8, 1949

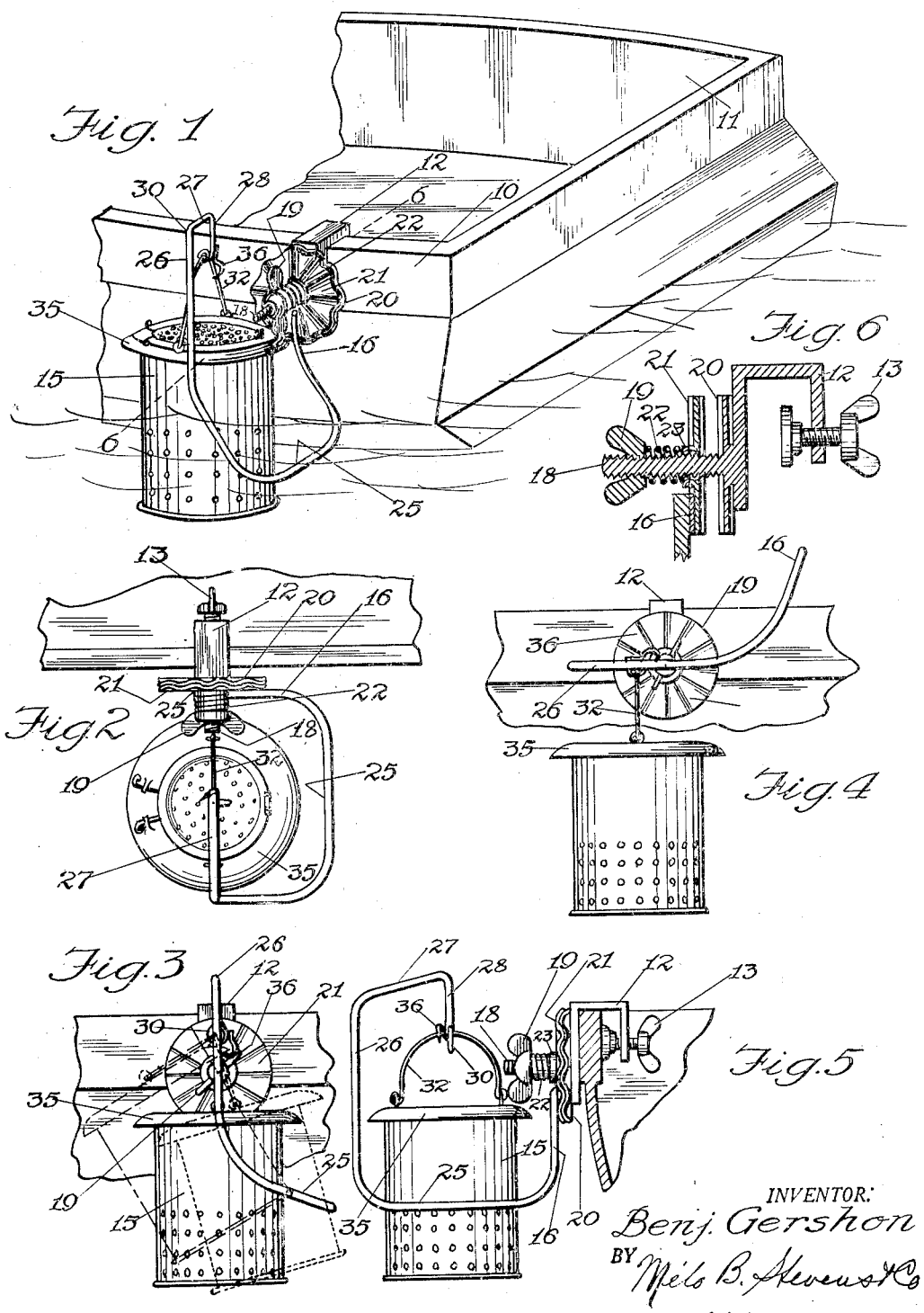

2,487,645

UNITED STATES PATENT OFFICE 2,487,645

MINNOW BUCKET

Benjamin Gershon, Chicago, Ill.

Application July 28, 1947, Serial No. 764,073

4 Claims. (Cl. 43—56)

1

My invention relates to minnow buckets, and more particularly to means for disposing the same in the position of use. Ordinarily, a minnow bucket is carried together with its inner container and placed in a boat with a supply of minnows inside preparatory to a fishing trip. When the location has been reached where the fishing is done it is customary to lift the inner container out of the bucket and tie the same by a rope to the rear of the boat, whereby to keep the minnows under water while the boat is standing, or to trail the boat in case trolling is done. In either case, one must haul in the rope every time it is desired to take out a minnow; also the position of the inner container in the water is uncertain and often unsuitable for preserving the minnows in live condition. Further, with the container tied to the boat, it often forms an impediment to the progress of the boat. Also, the trailing rope is apt to become tangled with the propeller blades, oars or fishing lines; and when the propeller is in action it is impossible to keep the trailing container down in sufficient water to keep the minnows alive.

In carrying out the present invention, it is one object to provide means for attaching the inner container close to the boat while allowing it to occupy a suitable depth in the water.

Another object is to provide means yieldably disposing the inner container, so that it may not constitute a drag on the progress of the boat.

A further object is to provide means for disposing the inner container detachably, so that it may be restored to the minnow bucket when the same is to be removed or carried away from the boat.

Another object is to dispose the inner container for rotary adjustment.

An additional object is to provide a holder for the inner container which is simple and durable.

With the above objects in view, and any others which may suggest themselves from the description to follow, a better understanding of the invention may be had by reference to the accompanying drawing, in which—

Fig. 1 is a perspective view of the rear portion of a fishing boat, showing the manner in which the inner container is carried;

Fig. 2 is a top plan view of the container installation;

Fig. 3 is a side elevation of the container in the original position;

Fig. 4 is a side elevation, showing a change of position;

Fig. 5 is a rear elevation; and

2

Fig. 6 is an enlarged section of a clamp taken on the line 6—6 of Fig. 1.

Referring specifically to the drawing, 10 denotes the side wall of a typical fishing boat 11. For the purpose of the invention, the side wall 10 is engaged by a U-clamp 12 operated by a thumbscrew 13 from the inner side. The inner container of the minnow bucket is indicated at 15, and the same is supported from the clamp 12 by a wire rod carrier 16.

The application of the carrier 16 to the clamp 12 is more clearly indicated in Fig. 6. Thus, the clamp is extended with a screw 18 in outward direction, the outer portion of the screw receiving a wing nut 19. Before the extension of the screw 18 the outer side of the clamp carries a corrugated disc 20 toward which a companion disc 21 freely mounted on the screw 18 is movable. The disc 21 receives the inner end of the carrier 16, and the angle of the latter may be changed by turning the disc 21 in one or the other direction before it is moved upon and meshed with the disc 20. Pressure on the disc 21 for this purpose is secured by advancing the wing nut 19 against a spring 22 to bear on a washer 23, the spring and the washer being freely mounted on the screw 18. The pressure is transmitted through the spring and the washer through the disc 21 to maintain the latter at any point in its rotary adjustment.

The carrier 16 is extended from the disc 21 with an inclined pocket 25, continuing from the latter with an upward portion 26. The latter is extended inwardly with a bend 27 and then downwardly with a stem 28, the latter terminating with a scroll type of receptacle 30. The bail 32 of the inner container 15 may be threaded into the receptacle 30 to be supported therefrom as shown in Fig. 1.

With the container 15 mounted as in Fig. 1, it is shown partly submerged in the water; and the motion of the boat operates to create a circulation of air and water through the container conducive to the proper maintenance of the minnows in the container. However, in case the boat is in forward progress, such as for trolling, the suspension of the container will enable it to yield in a rearward direction, as indicated by finely-dotted lines in Fig. 3, so as not to form an impediment to the progress of the boat.

Means are also provided for locating the container 15 in a handy position in case minnows are to be removed from the container. For this purpose the latter is made with an annular flange 35 which is concaved from the bottom. The stem 28 is formed with a hook 36, and long dotted lines in Fig. 3 indicate how the container may be swung forward until the rear of the flange 35 is caught on the hook 36. The top of the container is thus easily accessible from the boat.

At times, it is advisable to sink the container 15 fully in the water in order to keep it cool. In such event, the disc 21 may be turned in a counter-clockwise direction according to Fig. 1, in which event the carrier 16 will assume the position indicated in Fig. 4, lowering the container 15 to the submerged position.

It will now be apparent that the novel suspension device dispenses with the rope method of attaching the inner container to the boat, and provides a fixture instead, the latter being clamped to the side of the boat. An adjustable carrier is applied to the fixture in a manner to suspend the inner container in the water to the normal depth required for the proper maintenance of its contents and at one side of the boat, where it will not be disturbed when the propeller is in action. Yet, the fixture is readily adjustable to change the depth of the container to any level. Further, in its normal position of use the container is suspended in a manner to yield in a rearward direction when the boat is in forward motion, so as not to impede its progress. At the same time, the suspension means is designed to check the excessive rearward swing of the container. Altogether, the device is an attachment which may be quickly applied to or detached from any boat, and is constructed of few and simple parts.

While I have described the invention along specific lines, various minor changes or refinements may be made therein without departing from its principle, and I reserve the right to employ all such changes and refinements as may come within the scope and spirit of the appended claims.

I claim:

1. Means for suspending a minnow container from the side of a boat comprising a bail for the container, a carrier suspending the bail, and a clamp for said side projecting the carrier in a manner to permit the rearward swing of the container when the boat is in forward motion, said carrier being a rod extended to said bail, and a pocket formed from said rod in the path of said rearward swing to stop the latter at a predetermined point.

2. Means for suspending a minnow container from the side of a boat comprising a bail for the container, a carrier suspending the bail, and a clamp for said side projecting the carrier in a manner to permit the rearward swing of the container when the boat is in forward motion, said carrier being a rod, and the end of the rod receiving the bail being in scroll form.

3. Means for suspending a minnow container from the side of a boat, said container comprising a top provided with an upwardly concaved marginal flange, and a bail, said suspending means comprising a clamp for said side and a carrier for said bail to render the container swingable forth and back alongside the boat, and means projected from the carrier and engageable by said flange on the forward swing of the container to a desired height to support the container at such height.

4. The structure of claim 3, the second-named means being a hook adapted to receive the rim of said flange.

BENJAMIN GERSHON.

REFERENCES CITED

The following references are of record in the file of this patent:

UNITED STATES PATENTS

| Number | Name | Date |
|---|---|---|
| 713,890 | Koch | Nov. 18, 1902 |
| 1,025,657 | Towne | May 7, 1912 |

FOREIGN PATENTS

| Number | Country | Date |
|---|---|---|
| 17,061 | Great Britain | June 5, 1916 |